United States Patent [19]

Parmer

[11] 4,187,387
[45] Feb. 5, 1980

[54] ELECTRICAL LEAD FOR CRYOGENIC DEVICES

[75] Inventor: Jerome F. Parmer, San Diego, Calif.

[73] Assignee: General Dynamics Corporation, San Diego, Calif.

[21] Appl. No.: 15,270

[22] Filed: Feb. 26, 1979

[51] Int. Cl.² ............................................. H01B 12/00
[52] U.S. Cl. .............................. 174/15 CA; 174/126 S
[58] Field of Search ........... 174/15 CA, 15 BH, 15 S, 174/15 R, 126 S, 128 S

[56] References Cited

U.S. PATENT DOCUMENTS

| 3,286,014 | 11/1966 | Williams | 174/15 CA |
|---|---|---|---|
| 3,349,161 | 10/1967 | Latham | 174/15 CA |
| 3,371,145 | 2/1968 | Camille, Jr. | 174/15 CA |
| 3,542,937 | 11/1970 | Dammann et al. | 174/15 CA |
| 3,610,809 | 10/1971 | Eigenbrod | 174/15 S |
| 3,654,377 | 4/1972 | Fleming et al. | 174/15 CA |
| 3,695,057 | 10/1972 | Moisson-Franckhauser | 174/15 CA |
| 3,715,452 | 2/1973 | Long | 174/15 S |
| 4,038,492 | 7/1977 | Kullmann | 174/15 CA |

*Primary Examiner*—Arthur T. Grimley
*Attorney, Agent, or Firm*—John R. Duncan; Hugo F. Mohrlock

[57] ABSTRACT

An electrical lead for cryogenic devices wherein a perforated conductive ribbon is folded in serpentine folds and fitted within an insulated vent. Boil-off gas is passed through the perforations in a heat exchange relationship with said conductive ribbon.

3 Claims, 3 Drawing Figures

ELECTRICAL LEAD FOR CRYOGENIC DEVICES

BACKGROUND OF THE INVENTION

The present invention relates to electrical leads and more particularly to electrical leads for devices immersed in a cryogenic fluid.

When electrical current is passed along a conductor to an electrical device immersed in a cryogenic fluid, such as for example liquid helium contained in a Dewar, heat conduction from the room temperature enviroment and the ohmic heat generated in the conductor results in the introduction of heat into the cryogenic liquid. Likewise heat from the warm area outside of the Dewar is passed along by the conductor and introduced to the cryogenic liquid. It is of course desirable to reduce this heat introduced to the cryogenic liquid to a minimum in order to reduce the loss of liquid due to boil-off.

Attempts have been made in the past to reduce the quantity of heat reaching the cryogenic liquid by cooling the electrical leads to the device immersed in the liquid by utilizing the boil-off gas from the liquid. The boil-off gas leaves the Dewar by means of a duct which has contained therein an electrical conductor in such a manner as to be in heat-exchange relationship with the gas flowing therethrough. One embodiment utilized a mesh screen rolled into a cylinder and suspended within the duct to act as the lead. The strands of the mesh screen extending in the longitudinal direction carried the current, while the transverse strands functioned as cooling members. A large number of small conductors maximized the effective surface area exposed to and in contact with the boil-off gas coolant. The disadvantage of such an arrangement was that the length of the duct must be at least as long as the lead, which in some applications was cumbersome.

In order to reduce the length of the duct to something less than the entire lead length, the lead was formed of an electrically conducting strip edge-wound to form a helix that when installed in a cylinder defined a helical duct through which the boil-off gas coolant flowed in heat-exchange relationship with the conductor strip. In order to prevent inefficient laminar flow, increased thermal conductivity was obtained when the gas flow was caused to be turbulent by using a crinkled copper strip for the conductor. The thickness of strip that can accommodate such crinkling will limit the current carrying capacity of the conductor.

SUMMARY OF THE INVENTION

The invention relates to electrical leads for devices immersed in a cryogenic fluid or cooled in a similar manner.

The invention utilizes a folded conductor ribbon contained in a duct jacket to thereby form a cascade cooling device for the ducting of the boil-off gas coolant.

It is an object of the present invention to provide electrical leads having as a characteristic a more efficient heat exchange because of their construction and arrangement.

It is another object of the present invention to provide electrical leads which are easy and economical to construct, utilizing readily available materials.

Another object of the present invention is to provide electrical leads for devices at cryogenic temperatures which are compact, efficient heat exchangers, which may be sized to carry higher electrical currents than can generally be realized with prior-art designs.

These and other objects are accomplished according to the present invention by utilizing a new and novel arrangement of folded ribbon conductor having perforations disposed thereon for inducing high velocity turbulence in the boil-off gas flow to thereby improve the heat exchange characteristics.

The above and other objects and advantages of the present invention will be clearly understood from a consideration of the following description taken together with the accompanying drawings wherein one embodiment of the invention is shown by way of example, it being understood for purposes of illustration only, and such drawings and description are not to be construed as limiting the scope of the present invention.

DESCRIPTION OF THE DRAWINGS

In the drawings, wherein like numbers designate like parts throughout the several views.

DESCRIPTION OF THE PREFERRED EMBODIMENT

Figure 1:
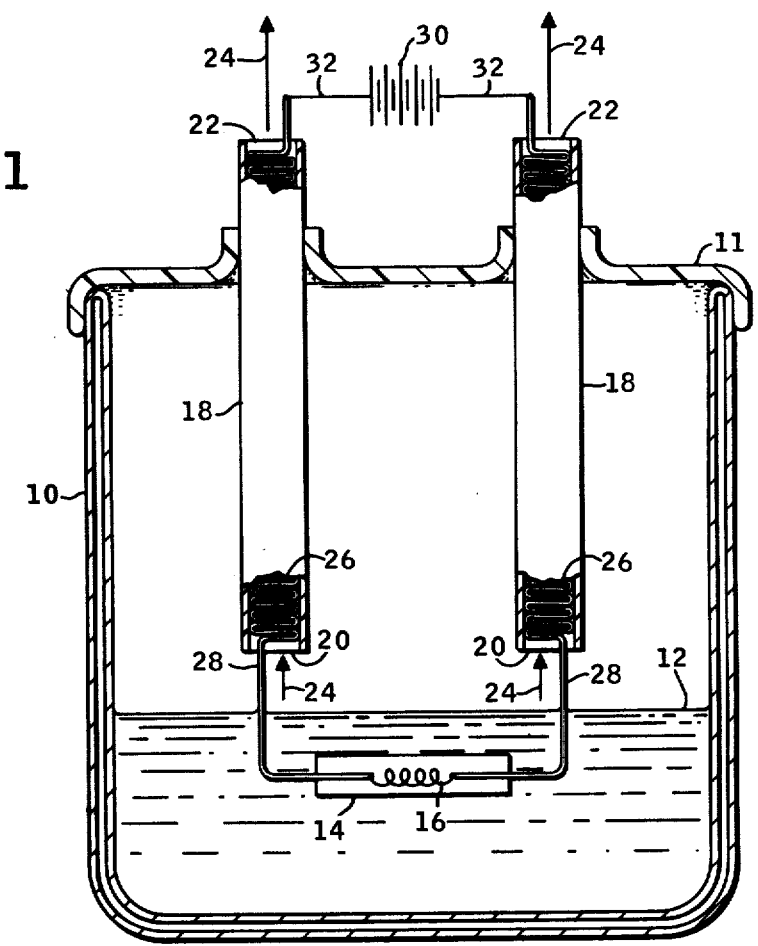
FIG. 1 is a sectional side view of a Dewar having an electrical device immersed in a cyrogenic liquid and electrical leads in accordance with the present invention connected thereto.

Referring now to the drawings in detail, FIG. 1 illustrates a Dewar 10 containing a cryogenic liquid 12, such as for example liquid helium, with a cover 11. Immersed in the cryogenic liquid 12 is an electrical device 14 which is intended to be operated at cryogenic temperatures. The electrical device 14 is schematically shown to have an electrically-conductive load 16, which is shown as a coil, however device 14 may be any kind of device requiring a supply of electrical current. The device 14 may even be a superconductor, in which case the device would have zero resistance to the electrical current flowing therein.

Suspended above the surface level of the cryogenic liquid 12 are two vent ducts 18 passing through cover 11 which act as ducts to pass boil-off gas out of the Dewar. The vent ducts 18 should be made of a material having high thermal and electrical insulating properties, such as for example a reinforced resin plastic. Boil-off gas enters the vent duct at the lower end 20 and exits the vent duct at the upper end 22. It should be understood that the gas 24 exiting the vent ducts 18 may be escaping into the atmosphere as schematically indicated for clarity, however in most conventional arrangements the escaping gas 24 is collected and reliquified for reuse. The means for collecting and reliquifying are not a part of the instant invention, and since they are well known to those skilled in the art they are omitted for clarity.

Disposed within each vent duct 18 is a serpentine electrical lead 26 which is connected to the electrical device 14 by means of conductor 28. At the opposite end the lead 26 is connected to a power source 30 by means of conductor 32. In operation, the heat outside of the Dewar 10 is conducted by leads 26 into the Dewar, and the current supplied to the immersed device 14 by way of the leads 26 produces additional ohmic heating therein which is conducted down the conductors 28 into the cryogenic liquid 12, thereby increasing the loss thereof by boil-off.

Figure 2:
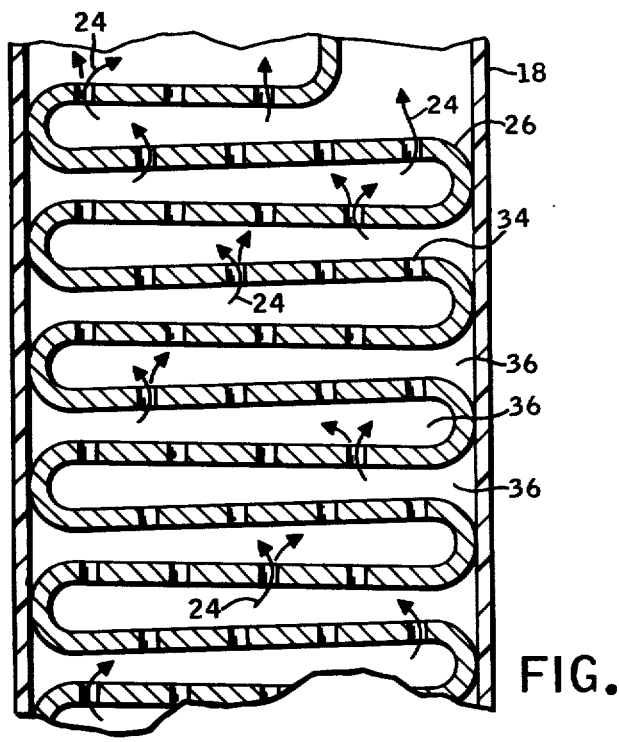
FIG. 2 is an enlarged sectional side view of a portion of the vent duct and lead.
Figure 3:
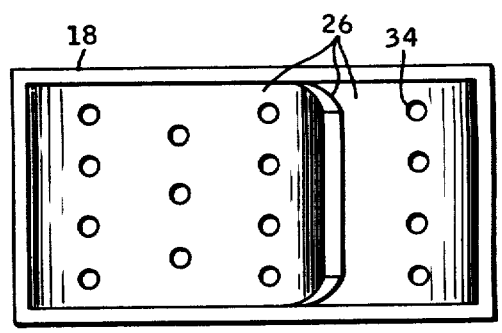
FIG. 3 is a top view of the lead shown in FIG. 2.

In the present invention however, the boil-off gas in leaving the Dewar 10 through the vent ducts 18 extracts heat from the leads 26 and thereby reduces the heat conducted to the cryogenic liquid 12. This may be more clearly seen by referring to FIGS. 2 and 3, wherein an enlarged portion of the vent duct 18 and lead 26 are shown. The lead 26 is made from a conductive metal strip or ribbon, such as copper, having holes or perforations 34 disposed thereon. The metal ribbon is folded into the serpentine shape and inserted in the duct 18, as shown in FIG. 2.

Boil-off gas passes through the plurality of vent holes 34 from one chamber 36 to the next chamber 36, formed by the serpentine shape of lead 26, in a cascading arrangement. The vent holes 34 cause the escaping gas to be at a high velocity and turbulence which greatly improves the heat exchange between the gas and the large surface area of lead 26.

The width and thickness of the ribbon used to form the lead 26 is a function of, among others, the amount of current to be carried. The overall length of the ribbon lead 26 is a function of, among others, the temperature difference between the external warm end and the cryogenic liquid temperature, the mass-flow rate of the gas through the vent 18, and the effective thermal conductivity of the serpentine lead and vent assembly. The mathematical method for preliminary calculations of these parameters is well known to those skilled in the art, and final dimensions are usually best arrived at empirically.

Mass-flow through the vent 18 is a function of the total area of the holes 34, while the turbulence of the gas is a function of the size of each individual hole 34. Thus, it may be seen that the total pressure drop through the vent 18, the mass-flow through the vent 18, and the amount of turbulence in the coolant gas may be adjusted by the number and size of the holes 34 and their geometric arrangement on the ribbon lead 26.

Thus it may be seen that the objectives of the invention have been met, wherein a long electrical lead is contained within a relatively short vent duct. This is accomplished by forming a conductive ribbon into a series of serpentine folds, thereby forming a plurality of chambers which are interconnected by means of holes in the ribbon. Coolant gas may pass form chamber to chamber by means of these holes, thereby exposing the large surface area of the ribbon to the coolant gas for heat exchanging. The thermal efficiency is improved by causing turbulence of the coolant gas as it exits each hole in the ribbon. The folded ribbon lead permits differential expansion to take place between the vent and the lead with no significant structural loads imposed thereon.

The features and advantages of the invention should be clear from the foreging figures and description which have been drawn to a single embodiment, and the invention is not to be limited to the specifics herein set forth, since other features, arrangements, and advantages not specifically described will occur to those skilled in the art, as will other variations and modifications of the preferred embodiment, all of which may be accomplished without departing from the spirit and scope of the invention as claimed.

Having now described my invention so that others skilled in the art may clearly understand it,

I claim:

1. An electrical lead for supplying current to a device maintained at cryogenic temperature comprising, a vent duct made of electrical and thermal insulating material, and a perforated conductive ribbon folded in a plurality of serpentine folds and disposed within said vent duct.

2. The electrical lead of claim 1 wherein said perforated conductive ribbon is copper.

3. In a container holding a cryogenic liquid, an electrical lead for supplying current to an electrical device immersed in said cryogenic liquid comprising, a vent made of an electrical and thermal insulating material, said vent disposed above said cryogenic liquid and leading from said container, an electrical conductive ribbon folded into a plurality of folds and fitted in said vent to define a plurality of chambers within said vent, said ribbon shaped to form a plurality of holes interconnecting each of said chambers through which boil-off gas from said cryogenic liquid cascades in heat exchange relationship with said folded ribbon.

* * * * *